United States Patent [19]
Weber et al.

[11] Patent Number: 5,156,747
[45] Date of Patent: Oct. 20, 1992

[54] SEPARATION OF LIQUIDS WITH DIFFERENT BOILING POINTS WITH NEBULIZING CHAMBER

[75] Inventors: Roland E. Weber, Springfield, Mass.; Lawrence K. Wang, Latham, N.Y.; John J. Pavlovich, W. Springfield, Mass.

[73] Assignee: International Environmental Systems, Inc., Pittsfield, Mass.

[21] Appl. No.: 778,778

[22] Filed: Oct. 18, 1991

[51] Int. Cl.⁵ .............................................. B01D 3/42
[52] U.S. Cl. .................................. 210/744; 202/197; 203/2; 203/26; 203/49; 210/90; 210/134; 210/177; 210/180; 210/194; 210/774; 210/805; 261/2; 261/78.2; 261/128
[58] Field of Search ............... 210/708, 744, 774, 804, 210/805, 806, 86, 90, 104, 143, 149, 177, 180, 182, 194, 195.1, 205, 258, 259, 513, 134; 208/184, 185, 345, 359; 203/10-12, 40, 49, 2, 24, 26; 261/2, 3, 7, 78.2, 128-131, 135, 151, 152, 157; 202/197, 236

[56] References Cited

U.S. PATENT DOCUMENTS

| | | | |
|---|---|---|---|
| 235,521 | 12/1880 | Fox | 202/234 |
| 1,189,083 | 6/1916 | Forward | 196/135 |
| 1,493,756 | 5/1924 | La Bour | 203/90 |
| 1,632,959 | 6/1927 | Gartner | 203/49 |
| 1,709,230 | 4/1929 | Potter et al. | 208/185 |
| 1,823,185 | 5/1931 | Belden | 208/185 |
| 1,968,614 | 7/1934 | Novotney et al. | 210/774 |
| 2,047,157 | 7/1936 | Rodman et al. | 208/185 |
| 2,765,917 | 10/1956 | Francis et al. | 210/774 |
| 3,326,778 | 6/1967 | Mock | 203/49 |
| 3,608,279 | 9/1971 | West | 55/219 |
| 4,197,190 | 4/1980 | Foster | 208/187 |
| 4,289,589 | 9/1981 | Koehler et al. | 203/49 |
| 4,402,711 | 9/1983 | Stellacio et al. | 210/774 |
| 4,474,647 | 10/1984 | Asselineau et al. | 203/49 |
| 4,477,356 | 10/1984 | Grow | 210/741 |
| 4,623,447 | 11/1986 | Clampitt et al. | 208/187 |
| 4,666,587 | 5/1987 | Martin | 208/184 |
| 4,698,136 | 10/1987 | El-Allawy | 203/24 |
| 4,713,089 | 12/1987 | Robbins | 203/26 |
| 4,717,474 | 1/1988 | Sims | 210/180 |
| 4,734,159 | 3/1988 | Korenowski | 159/16.1 |
| 4,789,461 | 12/1988 | Clare et al. | 208/187 |
| 4,946,559 | 8/1990 | Kroneld et al. | 210/774 |

Primary Examiner—Robert A. Dawson
Assistant Examiner—Joseph Drodge

[57] ABSTRACT

Small quantities of one or more liquids having a high boiling point dispersed with a large quantity of one or more immiscible liquids having a lower boiling point are separated in a rapid and efficient manner. A non-reactive compressed gas is heated by recycled energy and make-up energy to a temperature above the boiling point of at least one liquid but below that of at least one other liquid. The heated gas is combined with the unheated liquid mixture to be separated, and the liquid-gas blend is mixed, heated and distributed by an improved nebulizer, forming a mist inside a vessel containing a pool liquid of at least one liquid having a boiling point higher than that of at least one other liquid, which pool liquid has been heated to a temperature above the boiling point of at least one liquid but below its own boiling point. The liquid having high-boiling-point in the mist settles by gravity and merges with the pool liquid. The vapor of liquid having low-boiling-point in the mist is discharged as the gaseous effluent which can be wasted or recovered. The resulting fractions of each component are then collected separately.

19 Claims, 3 Drawing Sheets

SEPARATION OF LIQUIDS WITH DIFFERENT BOILING POINTS WITH NEBULIZING CHAMBER

BACKGROUND OF THE INVENTION

The present invention relates to separation of liquid mixtures, and in particular to a method and apparatus for separating small quantities of a liquid having a high boiling point dispersed within a large quantity of immiscible liquid having a lower boiling point.

Efficient separation of emulsified liquid mixtures is necessary in a wide range of industrial environments. For example, the lubricants employed in equipment such as gas or air compressors combine with large volumes of water during operation, necessitating disposal of the entire liquid effluent. Because the effluent is considered hazardous waste due to the relatively small amount of lubricant present therein, the ability to separate the bulk liquid into hydrocarbon and liquid fractions permits restriction of expensive disposal measures to the hazardous material itself. In addition, pre-treatment of contaminated water prior to purification frequently benefits from initial separation of hydrocarbon fractions.

Reliable techniques for separating small quantities of hydrocarbons dispersed within a large quantity of immiscible liquid are few, and the apparatus which presently perform this function provide limited efficiency. There are three types of conventional methods/apparatus for oil-water separation: (a) gravity oil-water separators; (b) dissolved air flotation; and (c) chemical treatment.

Typical gravity oil-water separators, for example, commonly employ grease-traps, baffles, skimmers and-/or polishing filters to promote separation. Because they operate without phase changes, these systems require large quantities of energy for separation of free oils from the oil-water mixture, and typically cannot separate emulsified mixtures.

Dissolved air flotation is frequently used for further separation of oils from the oil-water mixture which has been previously treated by conventional oil-water separator. Chemical(s) may or may not be used.

Oil-water separation apparatus capable of operating on emulsions ordinarily utilize one or more emulsion-breaking chemicals for chemical treatment, in which either dissolved air flotation or gravity, sedimentation can be used for clarification. In general chemical treatment results in production of waste sludge that poses a solid-waste disposal problem.

The limitations associated with these oil-in-water systems derive from the respective physical properties of oil and water. The specific heat constant and heat of vaporization of water are much larger than those of typical organic compounds, including oils. Most oils boil at a higher temperature than that of water, however. Systems that rely on any form of distillation therefore require considerable energy input in order to raise the temperature of the mixture of 100° C. or above, because the overall specific heat of the mixture will be close to that of water; in addition, a further quantity of energy must be applied to induce boil-off of the water.

By contrast, systems designed to remove small quantities of water from large amounts of oil require significantly less energy; this is due to the lower specific heat of the mixture (which will be closer to that of the oil), as well as to the smaller absolute amount of water that must be vaporized. Furthermore, such systems typically operate at a lower temperature than oil-in-water systems in order to minimize boil-off of organic compounds along with the water; such boil-off is rarely observed with oil-in-water system.

DESCRIPTION OF THE PRIOR ART

Several systems have been developed for removing small quantities of water entrained within a heavy hydrocarbon, such as oil.

U.S. Pat. No. 235,521 issued to E. Fox on Dec. 14, 1880, describes a method of securing the separation of the aqueous matter or other impurity from the liquor proper, which consists in spraying the crude spirit upward by a jet of heated fluid, to give the proper direction to the lighter vapors, and thus promote their separation by gravity, exposing the liquid in a thin film upon a large extent of surface for the spirit-vapors to separate as the liquid runs down, and conveying these separated spirit-vapors upward and to a condenser, substantially as set forth. Fox's invention (U.S. Pat. No. 235,521) also relates to a distilling or rectifying apparatus which is the combination of a containing-vessel, plates or screens in the upper part thereof, a supply-tube for the crude spirit, vertical jet-tubes for the heated fluid that atomizes the liquid and vaporizes the spirit, a filtering-diaphragm above the plates or screens, and a pipe to the condenser, substantially as set forth.

U.S. Pat. No. 3,608,279 issued to R. W. West on Sep. 28, 1971, describes an apparatus for separating fatty acid distillates entrained in steam. The gaseous mixture is introduced into a vessel under temperature and vacuum pressure conditions that promote separation.

U.S. Pat. No. 4,197,190 issued to A. Foster on Apr. 8, 1980, discloses a process for dehydrating tars and hydrocarbon oils containing water, wherein such material is heated prior to being sprayed into a holding vessel. Separate outlets are provided for removing the separate components, and the water component is also scrubbed prior to release.

U.S. Pat. No. 4,789,461 issued to Clare et al on Dec. 6, 1988, describes a system wherein heavy crude oil containing water is sprayed onto a pool of heated oil that has been dehydrated; the water evaporated upon contact with the pool is evacuated through a vent.

The foregoing systems (U.S. Pat. Nos. 235,521, 3,608,279, 4,197,190 and 4,789,461), designed primarily for separating small quantities of water from large samples of oil, exhibit a number of disadvantages. These would be magnified if applied to an oil-in-water mixture. Because none provides any mechanism for intrasystem temperature maintenance, a large amount of energy must be introduced by external equipment to ensure that the temperature of the mixture at the point of separation remains at or above the distillation temperature; an oil-in-water system would require significantly greater energy input. All four of the foregoing systems also utilize spray nozzles to introduce the mixture into a separation vessel. Although spraying tends to break surface tension and thereby promote separation of the components, the utility of this technique is limited by the amount of mechanical shear that may be introduced. Furthermore, it has been found that use of spray nozzles at the temperatures necessary for efficient oil-in-water separation results in "searing," a phenomenon whereby the interior of the vessel becomes coated with solid material that acts as an unwanted insulation layer and interferes with heat transfer. The present invention relates to oil-water separation or liquid-liquid separation using the techniques of mainly recycled gas heating, nebulizing, gravity separation of high-boiling-point liquid, vaporization of low-boiling-point liquid, and condensation of low-boiling-point liquid, and aiming at energy recycle and reuse.

The process of treating hydrocarbon oils, is disclosed by C. B. Forward in his U.S. Pat. No. 1,189,083, issued Jun. 27, 1916. Forward's patent discloses a new technology involving atomizing the oil under controlled pressure with a heated vapor into the open interior of a chamber; then driving off the combined vapors and the unvaporized products through separate channels from said chamber, the said channels being kept under restrictions to maintain a vapor pressure in the chamber of seventy-five pounds and upward and to prevent vapor from escaping through the channel for the unvaporized products. Forward's invention also relates to the process of treating crude petroleum oil by superheating the oil and atomizing the same under controlled pressure into a chamber with a volume of heated vapor, and then separating the volatized from the unvolatized products in said chamber under a pressure with a minimum of about seventy five pounds maintained therein. Specifically, a steam boiler is used to generate the heated steam vapor. and an oil heater is used to heat the crude oil. Both the heated vapor and the heated crude oil meet together inside a separator through an atomizer. The present invention does not involve the use of a steam boiler nor an oil heater for oil-water separation. Specifically, when the present invention is applied to oil-water separation the oil-water mixture is not preheated by an oil heater and the inert gas, such as air (instead of steam vapor) is used for nebulization (instead of atomization) of the oil-water mixture. In the nebulization process of the present invention, the inert gas pretreated with the make-up heat as well as the recycled heat in pool liquid mixes, heats, and distributes the incoming, previously unheated oil-water mixture at the nebulizer forming a mist for separation of small amount of oil from a bulk of water vapor. In the atomization process of Forward's invention, the steam vapor generated by a steam boiler mixes with the preheated crude oil at the atomizer, forming aerosols for purification of crude oil. Furthermore, in the present invention, the water vapor is the liquid with low-boiling point to be separated or to be removed from the influent, while in Forward's invention, the water vapor is specifically produced for purification of the high-boiling-point crude oil.

The method and apparatus for liquid evaporation below ebullition point is disclosed by H. E. LaBour in his U.S. Pat. No. 1,493,756 issued May 13, 1924. Specifically, LaBour's invention relates to an improved method of and means for causing evaporation below the ordinary ebullition point, and for de-alcoholizing beer at such a relatively low temperature that the flavoring of the beer is not destroyed. LaBour's process of treating a fluid material for removing therefrom a volatile constituent, comprises moving a definite, constant charge of gas in a completely closed circuit of fixed volume, at one point in the circuit projecting the fluid to be treated in the form of a substantially complete fluid to be treated in the form of a substantially complete fluid curtain, deflecting the fluid downwardly away from said curtain, passing the gas upwardly through said fluid curtain and away from said deflected body of fluid, the gas picking up the volatile constituent in the form of a vapor, at another point in the circuit cooling the gas to condense out the volatile constituent, at another point in the circuit reheating the gas for repeated passage up through said fluid curtain, between said cooling point and said reheating point imparting an impelling force to the gas so as to maintain a relatively low pressure at the cooling point and a relatively high pressure at the reheating point, said completely closed circuit maintaining said charge of gas in an unvarying body against the introduction of atmosphere or extraneous gases and out of contact with liquid washes, whereby the volatile flavoring constituents of said fluid material are retained in said charge of gas. LaBour's invention does not relate to nebulization, which is the heart of the present invention.

The method for removing tetranitromethane from commercial trinitrotoluene is disclosed by R. H. Gartner in his U.S. Pat. No. 1,632,959, issued Jun. 21, 1927. Gartner's invention comprises atomizing commercial liquid trinitrotoluene by means of a nonreactive hot gaseous stream, subjecting the clouds thus produced to hot nonreactive gaseous streams until the tetranitromethane is vaporized, then subjecting the trinitrotoluene to cold non-reactive gaseous streams by which the trinitrotoluene is solidified, and then withdrawing the hot gases from the presence of the solidified trinitrotoluene. Again Gartner's invention does not relate to nebulization, which is the heart of the present invention.

The method for separating finely divided animal and vegetable fibers, such as the lint of wool, cotton, and linen waste, from lubricating oils is disclosed by T. W. Potter et al in their U.S. Pat. No. 1,709,230 issued Apr. 16, 1929. Their invention is particularly intended to be employed as a means of renovating oil coming from used journal-box waste. Specifically, the method of Potter et al for separation of lint and foreign matter from used journal-box oil comprises preheating a quantity of said oil to vaporize water therein, transferring the oil to a tank closed to the atmosphere and in communication with a condenser, applying heat and controlling the pressure in said closed tank to heat the oil therein to substantially complete vaporization without cracking to leave said lint and foreign matter on the bottom of said closed tank, and allowing the vaporized oil to condense in said condenser. In operation, both impure oil and steam are injected into a preheater from where the mixture of the preheated impure oil and steam flows to a heating tank to where additional steam is further added for complete vaporization. The totally vaporized oil is carried by the steam to a condenser from where the condensed oil is purified and collected, and the residual steam is discharged. The present invention, however, does not relate to vaporization of oil using steam.

The process of purifying used crank case oil, particularly from automobiles, so as to remove coloring matter and light hydrocarbons therefrom, and to raise the viscosity and lower the carbon content is described in U.S. Pat. No. 1,823,185 issued Sep. 15, 1931 to D. S. Belden. By means of Belden's process, one is able to accomplish these objects under conditions by which the fire hazard is greatly reduced. Briefly stated, Belden's process comprises mixing used crank case oil with from 1% to 30% by weight of a finely divided clay adsorbent, preferably of the acid-activated type, distilling the light components from such mixture while assisting the volatilization by bubbling through the mixture a lively stream of inert gas, such as $CO_2$ or nitrogen, stopping the distillation when the light constituents have been removed and then filtering the residual oil from the clay. Belden's best mode of process operation for purification of used lubricating oil comprises: mixing said oil with a clay adsorbent; heating said mixture to approximately 600° F., while bubbling therethrough a lively stream of inert permanent gas; distilling the lighter fractions from said oil and condensing them in an inert atmosphere; separating the condensate from the inert gas; and returning the latter eventually to a batch of oil and adsorbent under distillation. The present invention does not relate to: purification of a hydrocarbon oil, such as crank case oil by distillation; inert gas bubbling through said oil; and condensation of purified oil. Instead the present invention relates to: heating gas with recycled and make-up energy; nebulizing the oil-water mixture with the preheated gas; forming the mist; settling the high-boiling-point liquid by gravity; and discharging the waste steam resulting from the low-boiling-point liquid.

Prior method and apparatus for purifying liquids, or for rendering non-aqueous liquids such as mineral hydrocarbon oils anhydrous, free from dissolved gases, volatiles and volatile hydrocarbons which result from oxidation is described in U.S. Pat. No. 2,047,157 issued Jul. 7, 1936 to C. J. Rodman et al. The process of Rodman et al for removal of moisture and gases from non-aqueous liquids comprises introducing an inert gas into the liquid, spraying the liquid and contained gas in finely dispersed form in a vacuum to separate moisture and gases therefrom, introducing an anhydrous, gas-free adsorbent material into the liquid, filtering and adding inert gas to the filtered liquid, the process being effected out of contact with water and atmospheric gases. The process of Rodman et al for rendering non-aqueous liquids anhydrous and gas-free comprises feeding the liquid onto a rapidly rotating member in a closed system to cause the liquid to be impelled centrifugally in film-like form of substantially 1 millimeter thickness while continuously maintaining in the system a vacuum adapted to cause substantially instantaneous evaporation of moisture and gases from the liquid and while excluding air and extraneous moisture from the system, continuously removing from the system moisture and gases liberated from the liquid, and recovering substantially anhydrous and gas-free liquid. The present invention, however, relates to: gas heating with the make-up and recycled energy; nebulizing the gas-liquid blend with an improved nebulizer; gravity settling the high-boiling-point liquid; vaporizing the low-boiling-point liquid; etc. for liquid-liquid separation.

U.S. Pat. No. 3,326,778 issued to A. E. Mock on Jun. 20, 1967 describes a novel process involving the rapid passage of dry gas, preferably air, at extremely high temperature through an enclosure body of impure water whose surface is exposed to a gas environment of relatively high pressure, with the temperature of said impure body being maintained just below its boiling point for said environmental pressure even though the temperature of the air rapidly passing therethrough is substantially higher than said boiling point. In Mock's invention, the air is saturated with water vapor which in turn can be extracted by condensation, and the temperature of the impure body is maintained below its boiling point by adding impure water to the body as well as withdrawing concentrated impure water therefrom. The major components of Mock's invention includes: a flash evaporator, an air furnace, a steam boiler, a condenser and a pure water reservoir, which combined extract pure water from impure water, such as sea water. The present invention does not involve the use of Mock's major process components.

U.S. Pat. No. 4,289,589, issued to W. Koehler et al on Sep. 15, 1981 describes a process for separating toluene diisocyanate and/or higher boiling solvents from distillation residues obtained from the phosgenation of toluene diamine in the presence of solvents wherein the separation takes place in a fluidized bed at temperatures of 140° C. to 280° C. The invention of Koehler et al discloses mixing a liquid with a gas, and distilling. This prior art is made of record not relied upon. The present invention relates to mainly liquid-liquid separation by nebulization.

A process for purifying a $C_4$ and/or $C_5$ hydrocarbon cut containing water and dimethyl ether as impurities is disclosed by L. Asselineau et al in their U.S. Pat. No. 4,474,647 issued Oct. 2, 1984. Specifically, the $C_4$ and/or $C_5$ olefinic hydrocarbon cut, containing dimethyl ether and water as impurities, in a relative proportion of dimethyl ether to water of at most 5:1, is purified in a distillation zone where it is introduced at an intermediate level, distant from the top or from the bottom thereof by at least 3 theoretical plates, optionally with a stripping gas, and separated into a overhead fraction comprising an aqueous liquid phase and a hydrocarbon liquid phase at least partially recycled as reflux to the upper part of the distillation zone, and a bottom fraction formed of the purified $C_4$ and/or $C_5$ olefinic cut. The major process components of their invention include: a distillation column, a settler, and a condenser. The present invention does not involve the use of a distillation column, a settler and a condenser, and relates to mainly nebulization for liquid-liquid separation.

Still another method and apparatus for the separation of oil from water in an emulsion thereof is disclosed by H. B. Grow in his U.S. Pat. No. 4,477,356 issued Oct. 16, 1984. Grow's invention relates to inducing the oil-water emulsion into an elongated chamber at a temperature below the boiling point of water; recirculating a portion of the emulsion oil through the chamber at a boiling temperature well below the refining temperature of the oil; drawing off the product oil from the chamber end remote from said induction end thereof; and drawing off the water by-product as steam from the chamber above a controlled liquid level of emulsion-oil therein, waste heat from the product and by-product being conserved. The present invention has same application, but totally different operational principles and apparatus.

U.S. Pat. No. 4,666,587 issued to C. K. Martin, May 19, 1987 describes a process for recovery of a finished oil product from crude or waste oil contaminated with water and the like by heating the waste oil in a tank with a heating flame which may be gas or oil fired. In Martin's process, the waste oil is heated until vapors including light ends and the desired finished oil product are produced from the waste oil within the tank. The vapors are introduced into the heating flame so that additional heat is developed by such afterburning to heat the waste oil in the tank. The finished oil product as recovered from the waste oil is discharged from the tank by a suitable outlet pipe arrangement. The present invention relates to nebulization of a liquid-liquid mixture for their phase separation, thus is different.

A by-pass oil refining device for an internal combustion engine is disclosed by L. H. Sims in his U.S. Pat. No. 4,717,474 issued Jan. 5, 1988. Sims' apparatus is equipped with an atomizing nozzle that constricts oil flow from a solid contaminant filtering element to a vaporization chamber where liquid contaminants are vaporized. The atomizing nozzle has a constricting orifice which is of a diameter sufficiently large to allow recirculation of oil to the vehicle engine, but which is small enough so that oil from the filtering element entering the vaporization chamber is atomized into a mist. Atomization of the oil significantly increases the extent to which liquid contaminants are vaporized and removed. The present invention relates to liquid-liquid separation by nebulization (instead of nozzle atomization).

Still another apparatus and method for using a heated waste gas stream to evaporate a volatile component such as water or a solvent from a liquid solution is shown in U.S. Pat. No. 4,734,159 issued Mar. 29, 1988 to T. F. Korenowski. Korenowski's invention comprises a flue to feed the gas stream from the source of heated gas; a container having an inner chamber to hold the liquid for evaporation of the volatile compound and an outer chamber connected to the flue which forms a gas channel substantially surrounding the inner chamber through which at least a portion of the gas stream flows to supply heat to the inner chamber and evaporate the volatile component of the liquid solution; an inlet to feed the liquid solution into the inner chamber; upper and lower liquid level sensors to control the quantity of liquid solution fed into the inner chamber to establish a liquid level therein; a sparger for agitating the liquid solution in the inner chamber; a sump below the container and connected to the flue to receive any condensate from the gas stream and any liquid leaking from the inner chamber; an outlet to combine, vent and discharge the evaporated volatile component from the inner chamber and the gas stream from the outer chamber; and an outlet for removing the liquid from the inner chamber. While the present invention's application is also evaporation of a low-boiling-point liquid such as water from a liquid mixture, the present invention's apparatus and method is totally different.

SUMMARY OF THE INVENTION

In accordance with the present invention, a process and apparatus are provided for chemical-free and cost-effective separation of small quantities of a liquid having a relatively high boiling point (e.g. a hydrocarbon) dispersed within a large quantity of immiscible liquid having a lower boiling point (e.g. water) by mainly nebulization. The process may be sequentially repeated to separate liquid mixtures containing more than two components, and would be expected to operate successfully on virtually any two liquids (or mixtures) having a boiling point differential of at least 1° C.

The first step of the process consists of heating a gas (such as air) with the make-up heat and the recycled heat in a pool liquid. The gas will not react with any of the components of the liquid mixture to a temperature above the boiling point of at least one of the liquid components but below that of at least one other liquid component. The heated gas is then combined with the unheated liquid mixture to be separated in such a fashion as to produce a mist by nebulization technique. This liquid-gas blend is introduced into a vessel containing a heated pool liquid of at least one liquid component having a boiling point higher than that of at least another component. The temperature of the pool liquid should be maintained at a temperature above the boiling point of at least one component but below its own boiling point. Upon introduction into this environment, the high-boiling-point component · or components merge with the pool liquid while the low-boiling-point component or components quickly vaporize(s). The resulting gaseous fraction of the low-boiling-point component or components may then be collected, and the pool liquid periodically drained. (Hereinafter, the liquid mixture will be referred to as consisting of high-boiling-point and low-boiling-point components, it being understood that additional subcomponents may be present therein, and that repetition of the procedure may be necessary). In the preferred embodiments, the liquid-gas blend is introduced into the vessel by means of an improved nebulizer configured to produce a mist, and the non-reactive gas is heated by drawing the recycled heat through the heated pool liquid prior to combination with the liquid mixture.

Nebulizing the liquid mixture with a pre-heated gas has been found to greatly enhance mechanical shear. By breaking up the liquid into the smallest possible droplets consistent with acceptable throughput rates, maximum surface area is developed. This high surface area is exploited by use of the heated pool liquid, a key feature not found in the prior art. This pool liquid acts as a constant-temperature heat sink, effectively spreading the applied heat energy uniformly and thereby keeping the atmosphere of the vessel at a high temperature. When liquid droplets are expelled from the nebulizer, this high ambient temperature encourages immediate separation into liquid and gaseous components. The nebulizer directs the liquid-gas blend toward the pool liquid to prevent stray droplets of the high-boiling-point liquid from being collected along with the gaseous component produced from the low-boiling-point liquid. Because the temperature of the pool liquid is maintained above the boiling point of the low-boiling-point liquid, the pool liquid traps droplets of the high-boiling-point liquid but resists the immiscible vapor.

Another function of the pool liquid is to prevent searing when the high-boiling-point liquid is a hydrocarbon. If a source of heat is applied directly to an outer wall of the vessel, as in the prior art techniques, the hydrocarbon fraction will adhere to the inner walls and undergo searing.

The method of the present invention may also be carried out by means of an apparatus.

The following paragraph summarizes the present invention.

Small quantities of one or more liquids having a high boiling point dispersed with a large quantity of one or more immiscible liquids having a lower boiling point are collected for rapid and efficient liquid-liquid separation by the apparatus of the present invention. A non-reactive gas is heated by recycled energy and make-up energy to a temperature above the boiling point of at least one liquid but below that of at least one other liquid and flows to a nebulizer inside said apparatus. The heated gas is combined with the unheated liquid mixture to be separated, and the liquid-gas blend is mixed, heated and distributed by said nebulizer, forming a mist inside said apparatus containing a pool liquid of at least one liquid having a boiling point higher than that of at least one other liquid, which pool liquid has been heated to a temperature above the boiling point of at least one liquid but below its own boiling point. The liquid having high-boiling-point in the mist settles by gravity and merges with the pool liquid at the bottom inside said apparatus. The vapor of liquid having low-boiling-point in the mist is discharged to outside said apparatus as the gaseous effluent which can be wasted or recovered. The resulting fractions of each component are then collected separately.

BRIEF DESCRIPTION OF THE DRAWINGS

The operation and structure of the present invention will be understood more readily from the following detailed description taken in conjunction with the accompanying drawings, in which.

DESCRIPTION OF A PREFERRED EMBODIMENT

Figure 1:
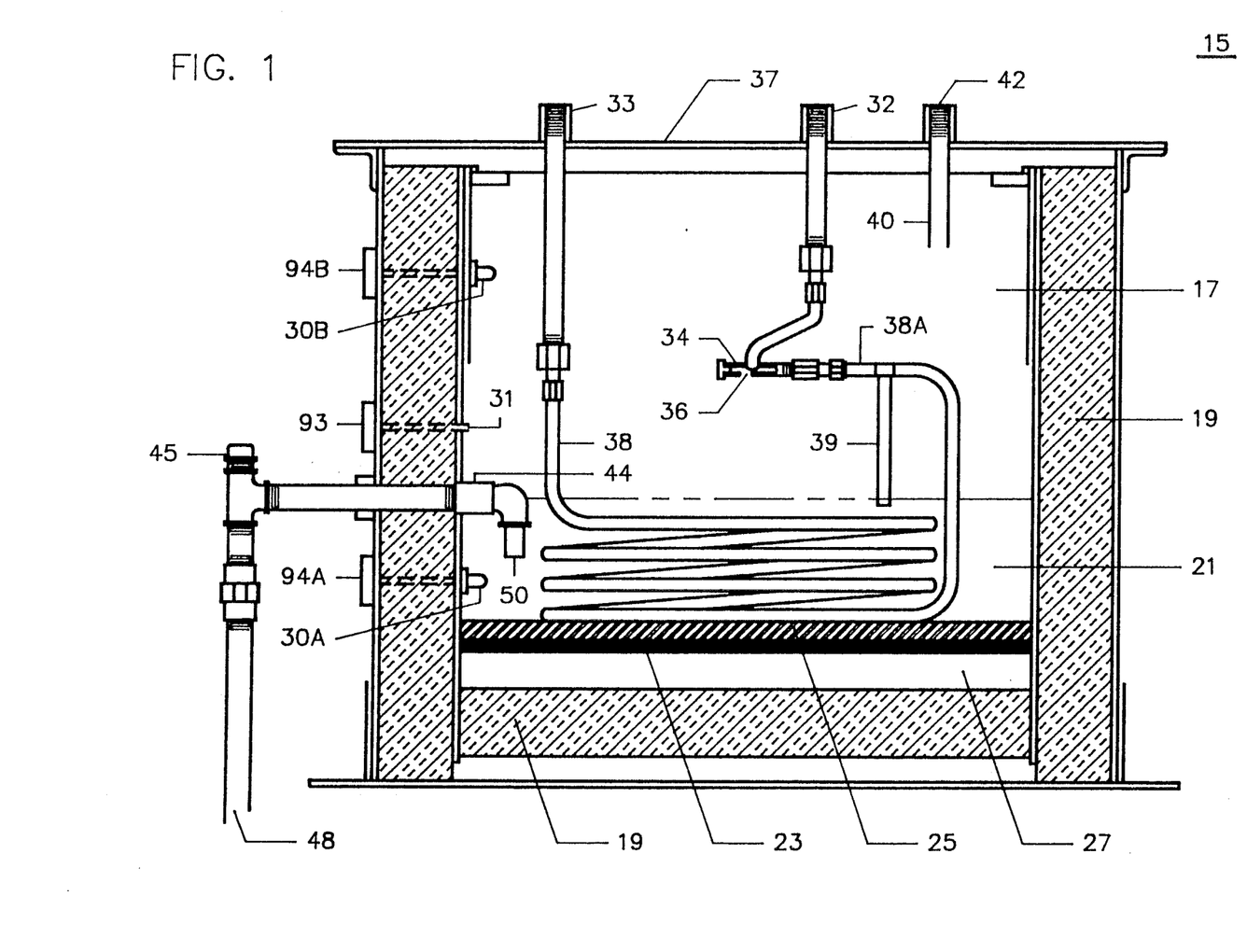
FIG. 1 is schematic depiction of the apparatus.

Referring first to FIG. 1, reference numeral 15 denotes generally a separator apparatus constructed in accordance with and embodying the invention. The separator apparatus 15 consists of a main chamber 17, which is surrounded by insulation layer 19. The chamber contains a pool liquid 21 of the liquid having the higher boiling point. Pool liquid 21 is heated by heater 23, which lies below and preferably in contact with bottom plate 25. With this configuration, it is desirable to leave a small air gap 27 between heater 23 and the bottom of insulation layer 19; this both enhances the effect of the insulation as well as protecting it from the effects of direct contact with heater 23. The heater can be designed differently (one alternative form being a pad surrounding chamber 17 within insulation layer 19) so long as the heat is delivered evenly over pool liquid 21. Localized heating has been found to adversely affect efficiency.

Heater 23 is adjustable, and must be set (manually or by means of a feedback temperature measurement circuit) to maintain the temperature of pool liquid 21 so as to fall between the boiling points of the two liquids in the mixture. The temperature of pool liquid 21 is monitored by thermometer probe 30A, which couples to a visible readout or to a feedback circuit; while the temperature and the pressure of chamber 17 are monitored by thermometer probe 30B and pressure probe 31, respectively.

Mounted on top member 37 of chamber 17 is an injection point 36 for an inert gas, such an air, which is introduced under low pressure into heat-conductive (e.g. copper) tubing 38 and thereafter into nebulizer 34. Tubing 38 is oriented so as to pass through pool liquid 21 and thereby allow the gas to be heated by the recycled heat substantially to the temperature of pool liquid 21. Tubing 38 may be coiled to facilitate sufficient contact time between the gas and pool liquid 21, and the flow rate at which the gas is introduced must also be low enough to allow adequate heating. However, this flow rate cannot be so low as to retard nebulization. In one embodiment, constructed to accomplish separation of approximately 0.75 gallon/hour of liquid-liquid mixture, the flow rate was about 0.003 cu. ft./minute. An additional length of tubing 39 is branched from tubing 38 in advance of nebulizer 34, with the open end thereof descending below the surface of pool liquid 21. Although the addition of tubing 39 is not absolutely required for operation, gas flowing therethrough promotes a slight turbulence in pool liquid 21; this action assists heat transfer from heater 23 to pool liquid 21, and from pool liquid 21 to the atmosphere within the chamber 17.

Also mounted on top member 37 of chamber 17 is an injection point 32 for the liquid-liquid mixture to be separated. The unheated liquid-liquid mixture is immediately directed to nebulizer 34, which combines the mixture with the heated inert gas. Nebulizer 34 directs the resulting liquid-gas blend downwardly through output bore 36, forming a mist, thereby facilitating contact between the vapor and pool liquid 21.

The process of separation begins at nebulizer 34 and is completed when the vapor reaches pool liquid 21. Droplets of the high-boiling-point liquid merge with pool liquid 21, while the component with the lower boiling point evaporates. Upon evaporation, this latter component exits through duct discharge 40 and may, if desired, be condensed at outlet 42 for collection and possible reuse.

The level of pool liquid 21, which increases in volume as liquid is drawn from the influent liquid-liquid mixture, is maintained at a relatively constant height by periodic or continuous removal through conduit 44 for collection at outlet 48. Conduit 44 is equipped with anti-siphon device 45, which is essentially an opening to an atmosphere, to prevent the level of pool liquid 21 from being drained to the level of outlet 50. Instead, the level of pool liquid 21 is best controlled by the height of conduit 44, antisiphon device 45 acting to maintain equivalence therebetween. Alternatively, removal may be accomplished using automatic withdrawal means responsive to the level of pool liquid 21.

If composed of more than two components, the liquid collected at outlet 48 can be subject to further separation by another separator apparatus 15 or by the same unit after the first phase of separation has been completed.

The preferred design for nebulizer 34 is shown in FIG. 2. The nebulizer 34 must produce droplets within an acceptable size range, and should also resist clogging. Optimal performance occurs when the droplets emerge in the form known in the art as a mist. Output as a spray, which consists of droplets larger than those in a mist, does not result in good separation. Conversely, output in the form of a fog, wherein droplets are smaller than those of a mist, permits escape of more than one component through the outlet intended for discharge of vapor.

Inlet conduit 60 in FIG. 2 admits the liquid-liquid mixture to be separated into hollow chamber 68, which is surrounded by corrosion-resistant body 62. One end of body 62 (FIG. 2) is coupled to the conduit 38A (FIG. 1) containing the preheated gas. The other end of body 62 is capped by solid plug 66. The liquid-liquid mixture and preheated gas react within hollow chamber 68 and are ejected through output bore 36. The diameter of output bore 36 should be large enough to discourage blocking due to buildup of liquid residue, but small enough to restrict the droplets size of the ejected output to the proper range.

The dimensions of the nebulizer 34 (FIG. 2) are largely dictated by the desired flow rate. Optimal performance has been found to occur when the liquid-liquid mixture is introduced at low pressure, approaching a gravity feed. The cross-sectional area of inlet conduit 60 must therefore be large enough to accommodate the desired flow rate at this low pressure. The distance 72 between inner edge 70 of solid plug 66 and the point of contact with inlet conduit 60 must be sufficiently long to permit the liquid-liquid mixture to react with the preheated gas before ejection; however, if the distance is too great, the reaction will be insufficient for nebulization to occur.

Figure 2:
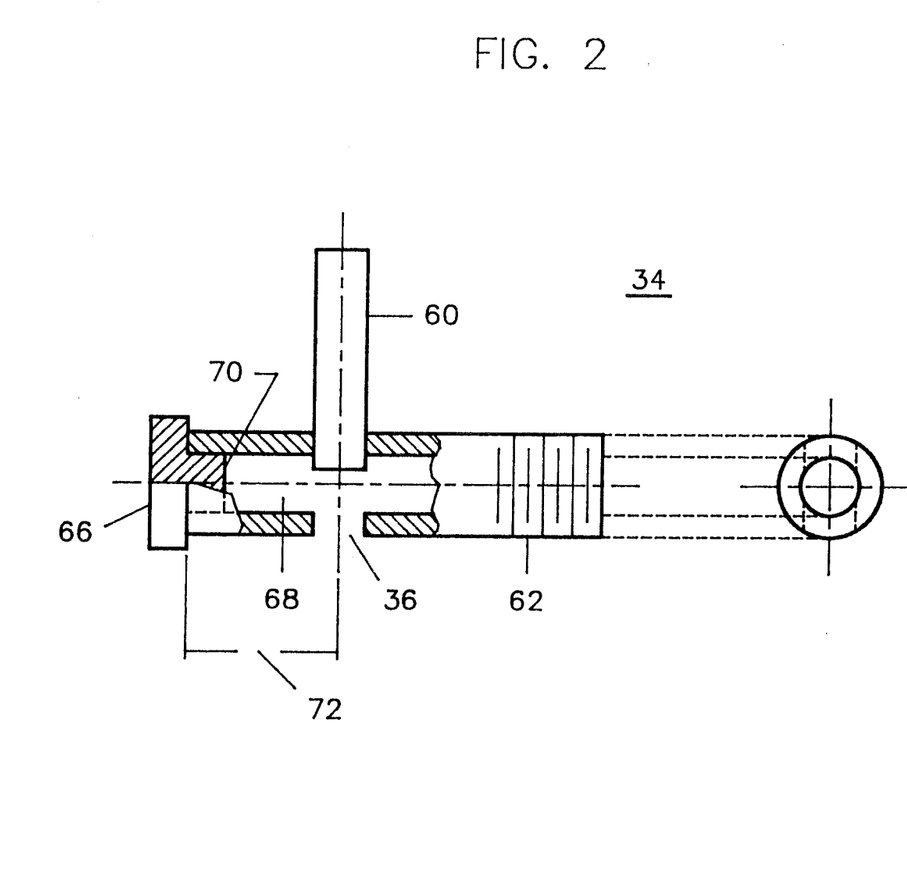
FIG. 2 shows the construction of a preferred form of nebulizer.

The foregoing criteria for the nebulizer 34 (FIG. 2) have been found to be satisfied where the interior diameter of inlet conduit 60 is approximately one-third to one-half the diameter of interior chamber 68 and approximately one-half the diameter of output bore 36. Representative dimensions for $\frac{3}{4}$ gallon/hour system include a distance 72 of 13/16", an inlet conduit 60 diameter of $\frac{1}{8}$", and an interior chamber 68 diameter of $\frac{1}{4}$".

Figure 3:
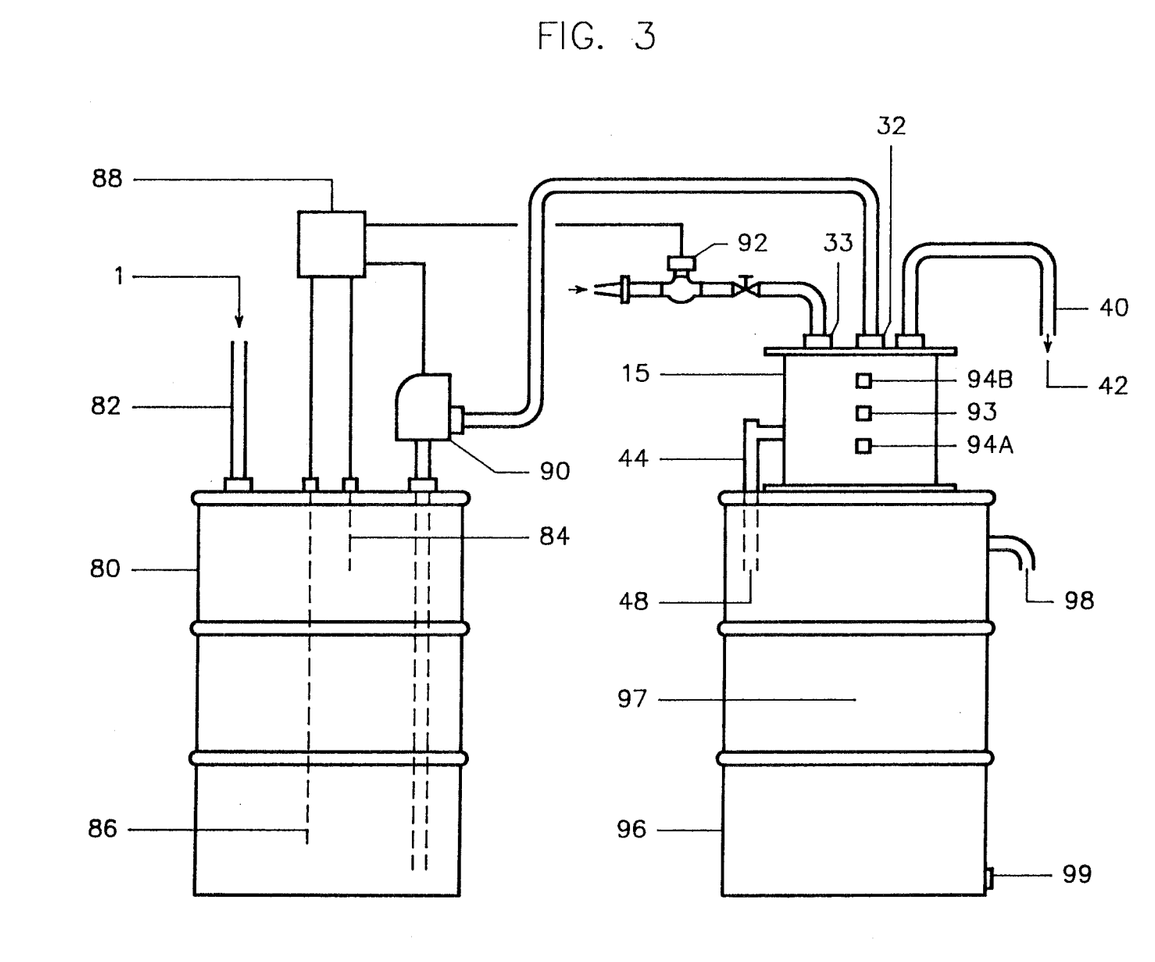
FIG. 3 presents a complete separation system based on the preferred embodiment of the present invention.

The present invention may be used in conjunction with other components to provide a complete and convenient system for separating emulsified liquid mixtures. Such a system is illustrated in FIG. 3. Bulk quantities of the liquid-liquid mixture 1 may be delivered to collection barrel 80 through inlet port 82. Barrel 80 is equipped with two electrodes 84 and 86, which are of different lengths. These serve as contacts in double-pole single-throw relay 88. Relay 88 controls the operation of pump 90 and air solenoid valve and air pump assembly 92. The pump of assembly 92 can be eliminated if the liquid-liquid mixture 1 source produces a suitable gas output. Compressors typically emit sufficient quantities of air at adequate pressures, permitting the air solenoid valve to be connected directly to the compressor's output.

When the liquid level in barrel 80 rises to the level of shorter electrode 84, the relay circuit is completed (assuming the liquid is conductive), causing relay 88 to close and actuate pump 90 (which transmits the liquid-liquid mixture 1 from barrel 80 to inlet 32 of separator apparatus 15) and assembly 92.

The separated liquid 21 in the separator apparatus 15 having comparatively higher boiling point, exits from the outlet opening 50 through the effluent conduit 44, as shown in FIGS. 1 and 3, to the outlet opening 48 (FIG. 1) and is to be stored in the collection barrel 96 (FIG. 3), from where the stored liquid 97 having comparatively higher boiling point is taken away from further liquid-liquid separation or final disposal when full.

The vapor resulting form vaporization of the liquid having comparatively lower boiling point exists through the duct discharge 40 to the outlet opening 42 (FIGS. 1 and 3) for discharge to the environment or for possible condensation for reuse.

A pressure gauge 93 and temperature gauges 94 and 94B are equipped on the separator apparatus 15 of the present invention, as shown in FIG. 3.

The collection barrel 96 is equipped with an overflow drain for emergency discharge of excess high-boiling-point liquid 97 into a tank (not shown), and with a drain 99 for draining the liquid 97 for proper final disposal.

There is thus provided by the invention a liquid-liquid separation method and apparatus which rapidly and efficiently vaporizes the low-boiling-point liquid, and collects the high-boiling-point liquid. The present invention conserves energy for heating the gas with the recycled heat in a pool liquid and insulating the entire separator; gently mixes the pool liquid with gas bubbles for better heat transfer; efficiently produces a mist for liquid-liquid phase changes and separation with an improved nebulizer; gravitationally settles the high-boiling point liquid; vaporizes the low-boiling point liquid for discharge; and collects the high-boiling point liquid for proper final disposal.

The present invention further comprises repeating steps stated above for the liquid remaining in said pool liquid if said pool liquid comprises more than one component.

Nebulization is the heart of the present invention. The relationships between the cross-sectional areas of said gas input means, said interior chamber and said output bore for an efficient nebulizer are such that the liquid will be ejected through said output bore as a mist.

In general, the cross-sectional area of the gas input means of the nebulizer is approximately one-third to one-half the cross-sectional area of the interior chamber and approximately one-half of the cross-sectional area of the output bore. The hollow chamber of the nebulizer extends a sufficient axial distance from the gas and liquid input means to facilitate nebulization. The cross-sectional area of said output bore is sufficient to retard clogging.

Oil-water separation is a typical application for the present invention. Under this process condition, the non-reactive gas is air, the liquid having low boiling point is water, and the liquid having high boiling point is oil.

The present invention occupies a relatively small space, is relatively low in cost, does not require adjusting pool liquid level in the separator, reduces the volume of liquid-liquid mixture, in turn, reduces the volume of contaminant.

While the present invention has been described with reference to particular embodiments thereof, it will be understood that numerous other minor modifications may be made by those skilled in the art without departing from the scope of the present invention. Therefore, the following claims are intended to cover all such equivalent variations as come within the true spirit and scope of the invention.

What is claimed is:

1. A method for separation of a relatively small volume of high boiling-point liquid from a liquid-liquid mixture containing a relatively large quantity of one or more immiscible liquids having a lower boiling point comprising the following steps:
    a) delivering bulk quantities of said liquid-liquid mixture to a collection barrel.
    b) monitoring the liquid level inside said collection barrel with electrodes,
    c) controlling operation of a liquid pump, a gas pump compressor, and gas solenoid valve with a relay,
    d) pumping said liquid-liquid mixture from said collection barrel to a liquid-liquid separator apparatus by said liquid pump when said collection barrel is full,
    e) compressing a gas using said compressor and passing the compressed gas, via the solenoid valve, to said liquid-liquid separator apparatus which consists of an insulated chamber, a heater by which the compressed gas is heated, a bottom plate, thermometer probes or gauges, a pressure probe or gauge, a liquid inlet, a gas inlet, a heat-conductive gas tubing, a branch heat-conductive gas tubing, a nebulizer, means for containing a pool liquid inside said chamber, a pool liquid effluent conduit, and a vapor dust discharge conduit,
    f) further heating said gas with said pool liquid by transferring heat through said heat-conductive gas tubing, g) gas bubbling said pool liquid through said branch heat-conductive gas tubing for enhancing heat transfer, h) nebulizing said heated gas and said liquid-liquid mixture with said nebulizer and forming a mist, i) gravitationally settling at least a portion of droplets of the high-boiling-point liquid component from said mist and merging the settled liquid droplets with said pool liquid, j) evaporating droplets of the at least one low-boiling-point liquid component from said mist as a vapor, k) exiting said vapor from said vapor duct discharge conduit for discharge into environment or for re-use, l) exiting excess high-boiling-point pool liquid from said liquid effluent conduit to a second collection barrel, and m) periodically draining the collected high-boiling-point liquid from said second barrel for proper final disposal.

2. The method of claim 1 further comprising repeating steps (a) through (m) for liquid remaining in said pool liquid if said pool liquid comprises more than one component.

3. The method of claim 1, wherein said non-reactive gas is air.

4. The method of claim 1, wherein one of the liquids in said liquid-liquid mixture is water.

5. The method of claim 1, wherein one of the liquids in said liquid-liquid mixture is a hydrocarbon.

6. A liquid-liquid separation system capable of separating a liquid-liquid mixture of at least two liquid components having different boiling points, comprising the following:

a) an inlet port means for allowing said liquid-liquid mixture to enter the liquid-liquid separation system, b) a first collection barrel means to receive and store said liquid-liquid mixture entered from said inlet port, c) means comprising two electrodes which are of different lengths inside said first collection barrel for monitoring the liquid level in said first collection barrel, d) a second collection barrel, e) a separator apparatus which is thermally insulated, filled with a pool liquid, and mounted on top of said second collection barrel for liquid-liquid separation, f) a liquid pump mounted on top of said first collection barrel and arranged for pumping said liquid-liquid mixture from said first collection barrel to said separator apparatus, g) a gas pump assembly means including valves and gas conduits for compressing a heated, non-reactive gas to be transported into said separator apparatus, h) a relay connected to said electrodes, said liquid pump, said gas pump assembly, and at least one solenoid valve for controlling pumping and valve operations in accordance with signals from said electrodes, i) means for transporting said liquid-liquid mixture from said first collection barrel to said separator apparatus, j) means for transporting said heated, non-reactive gas to said separator apparatus, k) a chamber means inside said apparatus to hold nebulizer means for liquid-liquid separation, and hold said pool liquid which contains at least a first component of said liquid-liquid mixture having a boiling point lower than at least a second component of said liquid-liquid mixture, l) means inside said separator apparatus for heating said liquid-liquid mixture to a temperature above said at least first lower boiling point component, m) means inside said separator apparatus for heating said non-reactive gas to a temperature above said at least first lower boiling point component, n) means inside said separator apparatus for gas bubbling said pool liquid to enhance heat transfer, o) means inside said separator apparatus for combining the heated gas with said heated liquid-liquid mixture comprising said nebulizer means, p) said nebulizer means comprising gas input means, liquid input means, an interior hollow chamber located adjacent to said gas input means and liquid input means, and an output bore; wherein the relationship between cross-sectional areas of said gas input means, said interior hollow chamber and said output bore are such that a liquid-gas blend is injected through said output bore as a mist, q) means inside said separator apparatus for vaporization and collection of the at least first component from said mist, r) means inside said separator apparatus for gravity sedimentation of said at least second component including means for merging at least a portion of said at least second component(s) with said pool liquid, s) means for withdrawing the at least first vaporized component from said separator apparatus, t) means for withdrawing an excess of the at least second component from said separator apparatus, u) means for measuring and controlling the temperature of said pool liquid inside said separator apparatus, v) means for measuring and controlling the temperature and pressure of said chamber inside said separator apparatus, w) means for transporting the excess at least second component to said second collection barrel, and x) means for draining said excess pool liquid from said second collection barrel.

7. The apparatus of claim 6, wherein said non-reactive gas is air.

8. The apparatus of claim 6, wherein one of the liquids in said liquid-liquid mixture is water.

9. The apparatus of claim 6, wherein one of the liquids in said liquid-liquid mixture is a hydrocarbon.

10. The nebulizer of claim 6 wherein the cross-sectional area of the gas input means is approximately one-third to one-half the cross-sectional area of the interior chamber and approximately one-half the cross-sectional area of the output bore.

11. The nebulizer of claim 6 wherein the hollow chamber extends a sufficient axial distance from the gas and liquid input means to facilitate nebulization.

12. The nebulizer of claim 6 wherein the cross-sectional area of said output bore is sufficient to retard clogging.

13. A separator apparatus capable of separating of a liquid-liquid mixture of at least two liquid components having different boiling points, comprising the following:

a) an inlet port means for allowing said liquid-liquid mixture to enter said separator apparatus, b) a gas port means for allowing a non-reactive gas to enter said separator apparatus, c) a liquid pump means for pumping said liquid-liquid mixture to said separator apparatus, d) a gas pump assembly means for compressing the non-reactive gas prior to its entering through said gas port means, e) insulation means surrounding said separator apparatus, f) a chamber means inside said separator apparatus for housing nebulizer means for liquid-liquid separation, and for containing a pool liquid which contains at least a first component of said liquid-liquid mixture having a boiling point lower than at least a second component of said liquid-liquid mixture, g) means inside said separator apparatus for heating said chamber means to a temperature above said at least first lower boiling point, h) means inside said separator apparatus for heating said non-reactive gas to a temperature above said at least first lower boiling point component, i) means inside said separator apparatus for gas bubbling said pool liquid to enhance heat transfer, j) means inside said separator apparatus for combining the heated gas with said liquid-liquid mixture comprising said nebulizer means, k) said nebulizer means comprising gas input means, liquid input means, an interior hollow chamber located adjacent the said gas input means and liquid input means, and an output bore; wherein the relationship between cross-sectional areas of said gas input means, said interior hollow chamber and said output bore are such that a liquid-gas blend is ejected through said output bore as a mist, l) means inside said separator apparatus for vaporization and collection of the at least first component from said mist, m) means inside said separator apparatus for gravity sedimentation of said at least second component including means for merging at least a portion of said at least second component with said pool liquid, n) means for withdrawing the separated at least first, vaporized component from said separator apparatus, o) means for withdrawing an excess of separated at least second component from said separator apparatus, p) means for measuring and controlling the temperature of said pool liquid inside said separator apparatus, and q) means for measuring and controlling the temperature and pressure of said chamber inside said separator apparatus.

14. The apparatus of claim 5, wherein said non-reactive gas is air.

15. The apparatus of claim 13, wherein one of the liquids in said liquid-liquid mixture is water.

16. The apparatus of claim 13, wherein one of the liquids in said liquid-liquid mixture is a hydrocarbon.

17. The nebulizer of claim 13 wherein the cross-sectional area of the gas input means is approximately one-third to one-half the cross-sectional area of the interior chamber and approximately one-half the cross-sectional area of the output bore.

18. The nebulizer of claim 13 wherein the hollow chamber extends a sufficient axial distance from the gas and liquid input means to facilitate nebulization.

19. The nebulizer of claim 13 wherein the cross-sectional area of said output bore is sufficient to retard clogging.

* * * * *